United States Patent
Fay et al.

(10) Patent No.: US 8,218,597 B1
(45) Date of Patent: Jul. 10, 2012

(54) DIODE PUMPED SOLID-STATE LASER FOR HIGH SHOCK ENVIRONMENTS

(75) Inventors: Josiah W. Fay, Highland Park, NJ (US); Joseph Leone, Oak Ridge, NJ (US); Henry Kerwien, Augusta, NJ (US); Thomas DeVoe, Lake Hopatcong, NJ (US); Gregory Burke, Hanover, NH (US); Arthur A. Karpinski, Jordan, NY (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 1010 days.

(21) Appl. No.: 12/115,195

(22) Filed: May 5, 2008

Related U.S. Application Data

(60) Provisional application No. 60/915,763, filed on May 3, 2007.

(51) Int. Cl.
*H01S 3/09* (2006.01)

(52) U.S. Cl. .......................................... 372/70; 372/69

(58) Field of Classification Search .................. 372/69, 372/75, 92, 70
See application file for complete search history.

(56) References Cited

U.S. PATENT DOCUMENTS

| | | | | |
|---|---|---|---|---|
| 5,216,688 | A | * | 6/1993 | Kortz et al. ..................... 372/75 |
| 5,521,936 | A | * | 5/1996 | Irwin ............................... 372/75 |
| 6,026,109 | A | * | 2/2000 | Micke et al. ................... 372/92 |
| 6,400,740 | B1 | | 6/2002 | Karpinski |
| 6,650,668 | B2 | * | 11/2003 | Yatskar et al. ................. 372/36 |
| 6,661,827 | B2 | * | 12/2003 | Lam et al. ...................... 372/75 |

OTHER PUBLICATIONS

Karpinski, A, Pump Donuts Simplify Side Pumping of Solid State Lasers, presented at Solid State and Diode Laser Tech. Review, Jun. 13-15, 2006.

* cited by examiner

*Primary Examiner* — Jessica Stultz
*Assistant Examiner* — Phillip Nguyen
(74) *Attorney, Agent, or Firm* — John F. Moran

(57) ABSTRACT

A diode pumped solid-state laser for high shock, high vibration environments such as those found in laser ignition systems for artillery systems.

5 Claims, 4 Drawing Sheets

DIODE PUMPED SOLID-STATE LASER FOR HIGH SHOCK ENVIRONMENTS

CROSS REFERENCE TO RELATED APPLICATION

This application claims the benefit of U.S. Provisional Application 60/915,763 filed May 3, 2007 the entire file wrapper contents of which are incorporated as if set forth at length herein.

FEDERAL INTEREST STATEMENT

The inventions described herein may be manufactured, used and licensed by the United States Government for United States Government purposes without payment of any royalties thereon or therefore.

FIELD OF THE INVENTION

This invention relates generally to the field of solid-state lasers and in particular is directed to a ruggedized solid-state laser for high shock and high vibration environments such as those found in artillery weapons.

BACKGROUND OF THE INVENTION

Conventional artillery systems and in particular 155 mm howitzer artillery weapons systems use energetic primers in their ignition train. Recently, advanced artillery systems have explored the use of laser ignition systems wherein the propellant charge is lased by an emitter positioned in the breech carrier of the artillery.

As can be appreciated, positioning a laser ignition system in the breech of an artillery system presents numerous problems. Among the most difficult of these problems are ones related to making the laser ignition system sufficiently robust to endure the extreme vibrations and shock produced by artillery systems as well as the extreme environmental conditions i.e., heat/cold, wet/dry experienced.

SUMMARY OF THE INVENTION

The above problems are solved and an advance is made in the art according to the principles of the present invention directed to a diode pumped solid-state laser for high shock/high vibration environments such as those found in the breech of an artillery system.

Viewed from a first aspect—the present invention is directed to a diode pumped solid-state laser employing a unique gain medium mounting which permits its use in high shock/high vibration environments. Contributing further to its robustness are diode arrays arranged in "donut" configurations along with an advanced (polycrystalline) gain medium (laser rod).

Viewed from another aspect—the present invention is directed to a diode pumped solid-state laser as part of a laser ignition system internally integrated into the breech of an artillery system such as a 155 mm howitzer. Advantageously—and in sharp contrast to prototype prior-art laser ignition systems incorporating flash lamps—the diode pumped solid-state laser of the present invention permits a seamless integration into a howitzer artillery weapons system without complex mounting provisions or shock isolation system(s). Of further advantage the diode pumped solid-state laser of the present invention facilitates integration into existing breech hardware with only minor modification to existing breech hardware thereby simplifying the breech and laser assemblies and integration requirements while reducing total system weight.

BRIEF DESCRIPTION OF THE DRAWING

Further features and advantages of the present invention may be understood from the drawing in which.

DETAILED DESCRIPTION

The following merely illustrates the principles of the invention. It will thus be appreciated that those skilled in the art will be able to devise various arrangements which, although not explicitly described or shown herein, embody the principles of the invention and are included within its spirit and scope.

Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Figure 1:
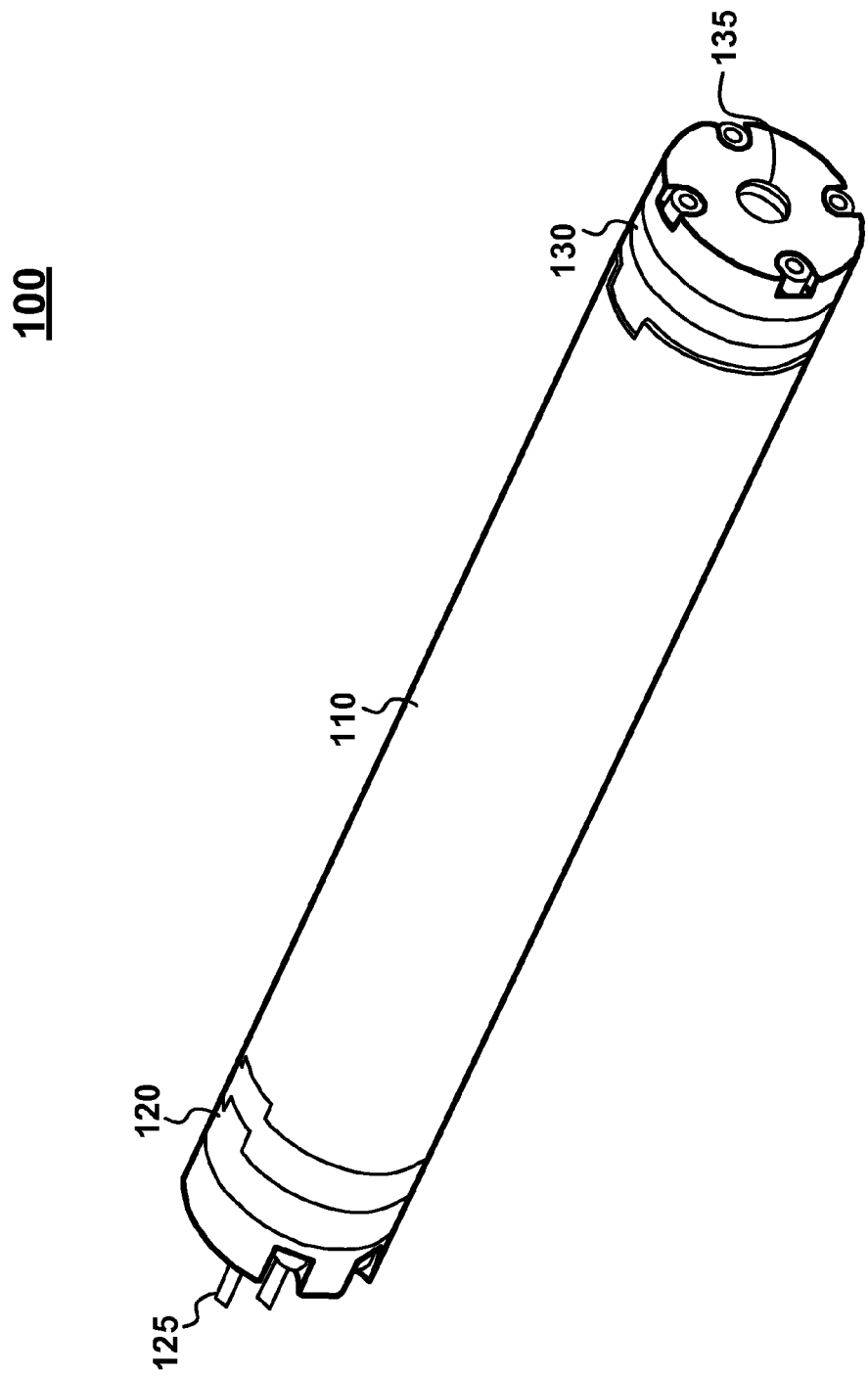
FIG. 1 is an external perspective view of a diode pumped solid state laser assembly according to the present invention.

In accordance with one preferred embodiment of this invention reference is made to FIG. 1, which shows an external view of a diode pumped solid-state laser according to the present invention. More particularly, one may observe laser body 110—generally a hollow tube structure—connecting two end caps 120 and 130 that are positioned at opposite ends of the body tube 110. Shown further in FIG. 1 are electrical leads or wires 125 and output aperture 135 which are part of input end cap 120 and output end cap 130 respectively.

By way of additional background, those skilled in the laser arts will quickly recall that lasers generally comprise three essential components: an active gain medium, a pumping mechanism, and a cavity.

Figure 2:
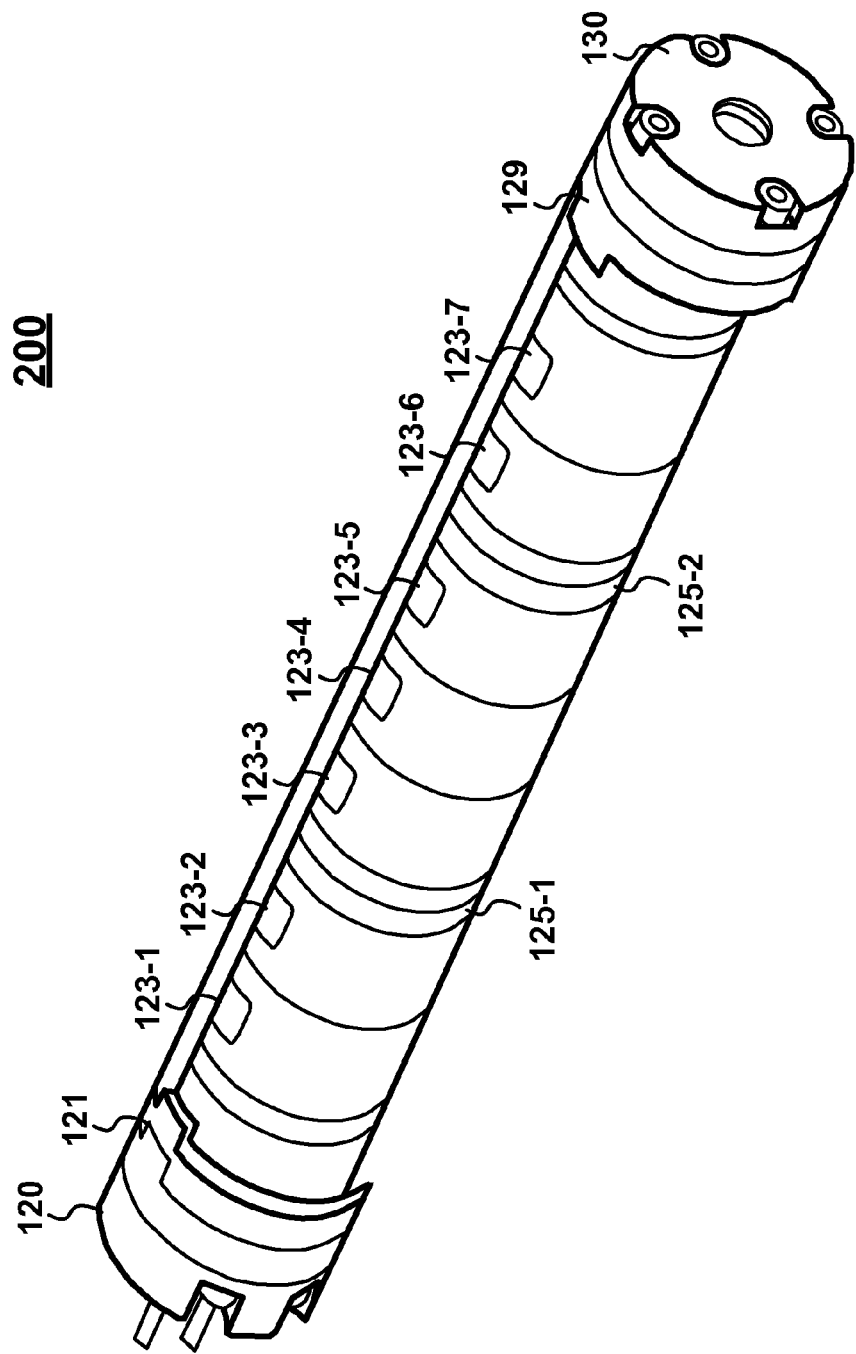
FIG. 2 is a sectional perspective view of a diode pumped solid state laser assembly according to the present invention.

Turning now to FIG. 2, there is shown a sectional view of the diode pumped solid-state laser of FIG. 1 with the body tube 110 removed. In this sectional view of FIG. 2, it may be seen that the laser assembly comprises a number of segments interposed between the input and output end caps 120 and 130, respectively.

In particular, a number of diode "donuts" 123-1, 123-2, . . . 123-3, 123-4, 123-5, . . . 123-6, and 123-7 comprise a number of the segments. Further interposed between particular sets of donut segments, and in particular donut segments 123-2 and 123-3 as well as 123-5 and 123-6 are intermediate support segments 125-1 and 125-2.

The stacked diode donuts form a pumping mechanism for the diode pumped solid-state laser of the instant application. While not specifically shown in this FIG. 2, each of the diode donut segments 123-1 . . . 123-7 have disposed along an inner surface a number of light-emitting laser diodes positioned around an inner perimeter of each of the diode donuts. In a preferred embodiment, we have found that 10 laser diodes have proven sufficient for each of the diode donuts.

The diode donuts 123-1 . . . 123-7 are stacked along a gain medium rod—which in a preferred embodiment is Yitrium Aluminum Garnet (YAG) or another suitable material. When configured in this manner, the gain medium rod is positioned within the "hole" of each of the diode donut segments.

Such a pumping scheme wherein an array of diode donuts each comprising a number of laser diodes has been shown and described in U.S. Pat. No. 6,400,740 the entire contents of which are incorporated herein by reference.

As disclosed in that patent however, the donut diode array configurations comprise arrays of laser diodes that utilize flying leads to connect one array to another. In a preferred embodiment of the present invention, a pin and socket configuration is employed instead of the flying leads.

When configured in this manner, the pin and socket configuration allows each of the diode array donuts to snap together into stacks. Advantageously, such reconfiguration permits the diode array pumping mechanism to decrease in overall size, simplifies the assembly of the diode array, reduces part count and increases the survivability for high shock and high vibration environments. This reconfiguration of the pumping mechanism enables the integration of the diode array into a smaller, more durable, and more manufacturable laser package suitable for our extreme environments Turning now to FIG. 3, there is shown a cross sectional view of the diode pumped solid-state laser according to the present invention. Of particular interest in this FIG. 3 are the mounting segments 121, 129 and intermediate mounting segments 125-1 and 125-2 in which may be observed the mounted gain medium rod 150.

In particular, intermediate mounting segments 125-1, 125-2 are generally disposed at the central portion of the overall stack and include a mid-rod support which are constructed from a compliant material such as Teflon and used to support the central portions of the laser rod 150. In this manner, the rod is supported and stress is minimized. As shown, the supports are incorporated in the overall stack between the diode array donut segments thereby mitigating thermal damage which may occur if they were directly illuminated by the diode pumps.

The mounting segments 121, 129 may generally include a compliant compression mechanism or ferrule at one or both ends of the rod 150. In this inventive manner, the rod 150 is supported at both ends and near its middle, with diode pumping donuts disposed therebetween the supports.

Figure 3:
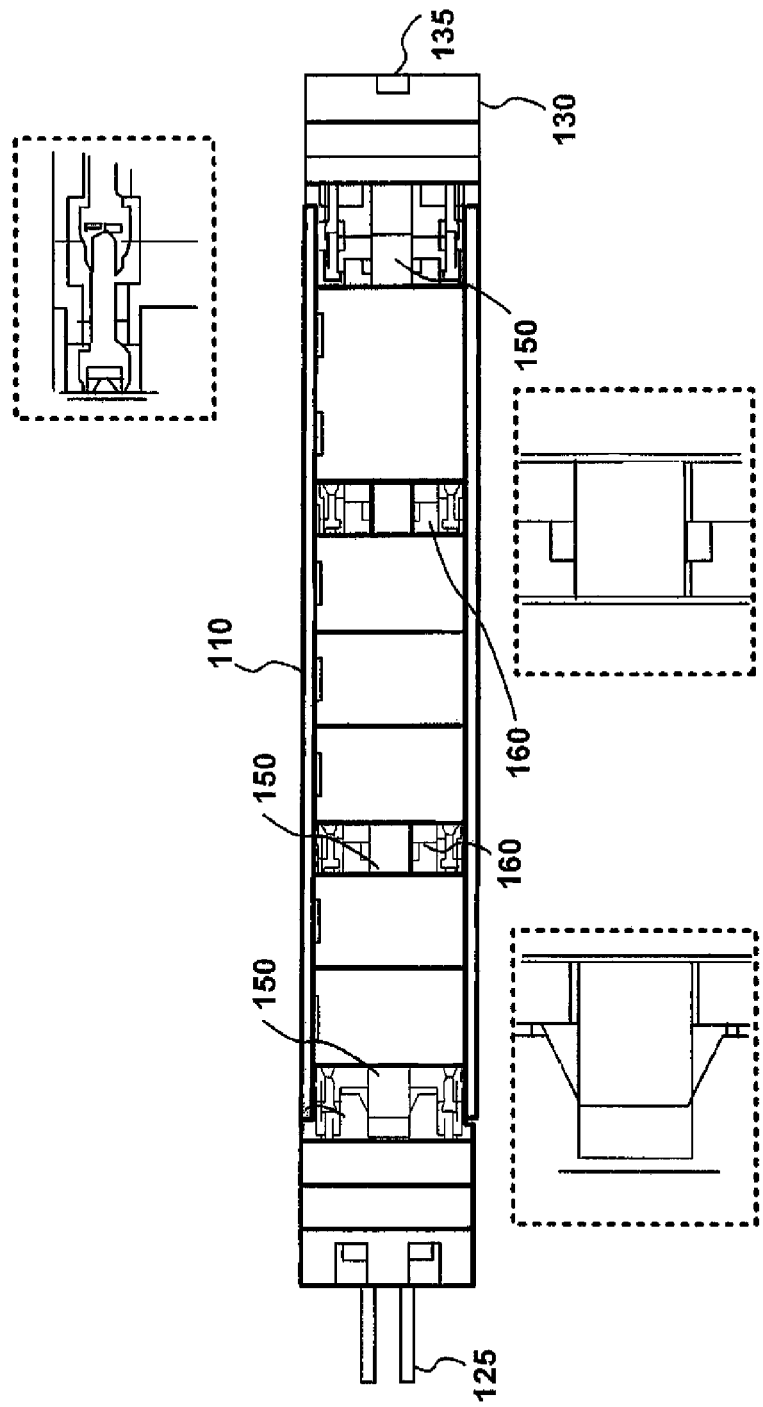
FIG. 3 is a cross sectional view of a diode pumped solid state laser assembly according to the present invention.

Shown further in FIG. 3 are electrical contacts 160 which in this exemplary embodiment are pin/socket mechanisms. In this manner when the individual segments are stacked around the laser rod, the electrical contact engage the two adjacent segments. Accordingly, electrical power which is applied to electrical contacts 125 will energize each of the diode segments comprising the stack. As a result when power is applied to the electrical contacts the diode segments are energized and thereby pump the active gain medium rod sufficiently to produce a laser action and laser output at output aperture 135.

Due to the extreme shock and vibration experienced by the laser system an advanced medium may be used for the active gain medium rod. In particular, and as can be appreciated by those skilled in the art, most conventional laser systems employ a single crystalline laser rod. For this high stress, high vibration system however, it is preferred that a polycrystalline (ceramic) laser rod be employed to thereby provide additional strength. Of further advantage, such materials generally offer higher laser efficiencies by increasing the ND doping concentration.

Those skilled in the art will recognize that conventional laser pumping applications of laser diode emitters which comprise the diode array donut segments have their output energy limited to maintain acceptable output. Thermal effects may cause changes to the output wavelength of diode emitters to a point that a diode driven device is not operational. In such circumstances, the diode temperature increases as the device is switched on.

A further aspect of the present invention is that the diode array is balanced along the length of the rod to sufficiently manage the output wavelength of the diodes within the required input wavelength of the active medium over an extended electrical pulse and temperature range, i.e., −50 C to +50 C without the need for ancillary for temperature control.

Figure 4:
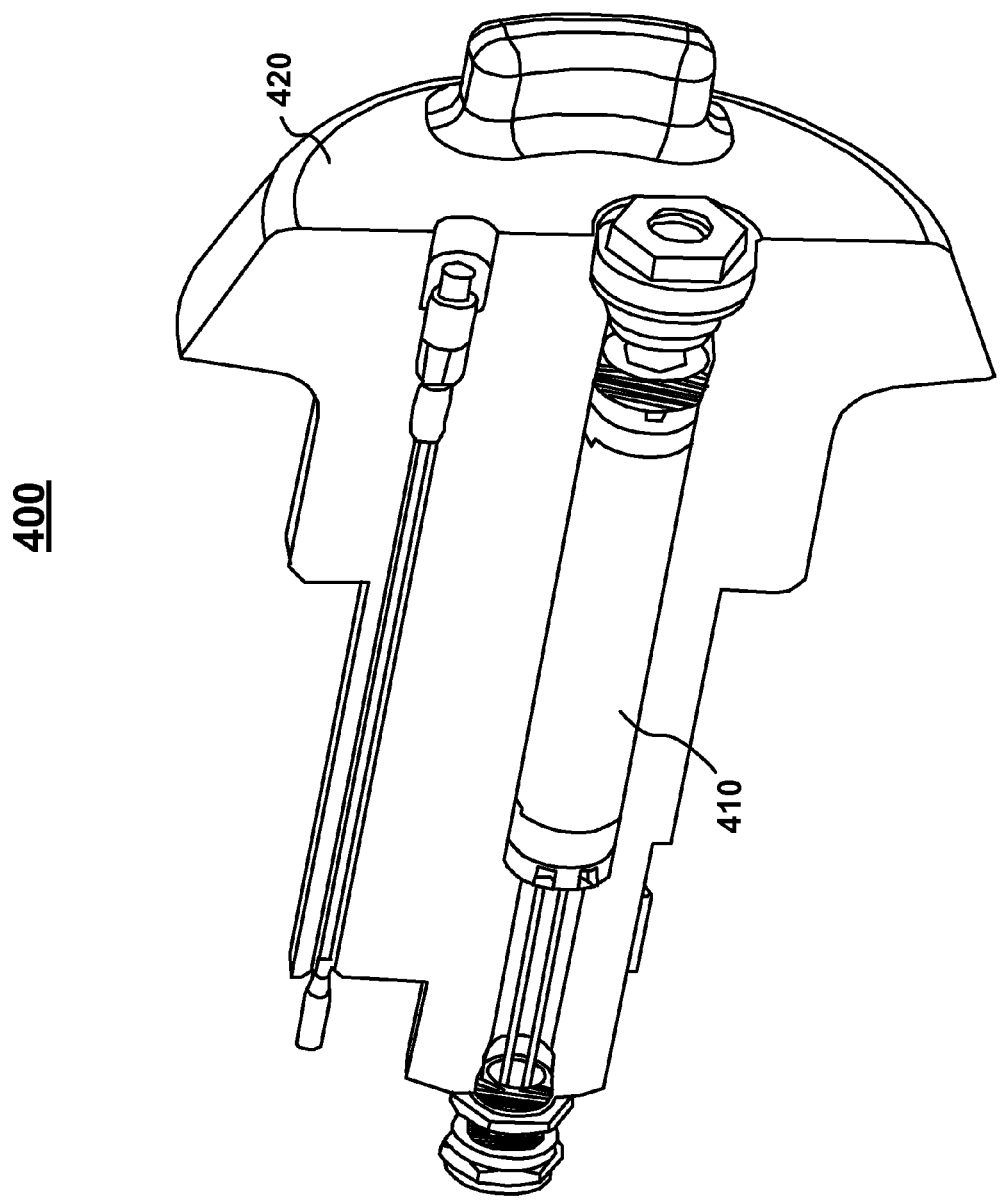
FIG. 4 is a cut-away view of a laser igniter including a diode pumped solid state laser assembly according to the present invention positioned in a large caliber artillery gun breech component.

Finally, with FIG. 4 shows a cut away view of a large caliber artillery gun breach 420 with a laser igniter 410 disposed therein. Operationally, the laser igniter is activated such that it produces laser light which in turn initiates an ignition train of an artillery propellant within the gun.

At this point, while we have discussed and described the invention using some specific examples, those skilled in the art will recognize that our teachings are not so limited. For example, the preferred embodiments of the invention have been provided for the purpose of explaining the principles of the invention and its practical application, thereby enabling others skilled in the art to understand the invention. Various embodiments and various modifications are contemplated. Accordingly, the invention should be only limited by the scope of the claims attached hereto.

The invention claimed is:

1. A diode pumped solid-state laser assembly for high shock, high vibration environments comprising:
   a rod shaped gain element formed from a polycrystalline form of YAG;
   a pair of end mounts, disposed within a pair of end segments at the ends of the rod shaped gain element for supporting the ends of the rod;
   a plurality of donut-shaped diode segments, each one having a plurality of laser diode devices disposed along the inner surface of the segments, said diode segments including an electrically and mechanically connected mechanism for electrically and mechanically connecting a particular diode segment to adjacent segments such that the resulting electrically and mechanically connected segments are stacked between the end mounts with the rod disposed along the interior portion of each one of the segments;
   a number of intermediate support segments; positioned between selected ones of said diode segments; said intermediate support segments including an electrically and mechanically connected mechanism for electrically and mechanically connecting the intermediate support segments to any adjacent segments; said intermediate support segments including a support structure for supporting the rod; and
   an electrical connection to the assembly such that when power is applied to the connection, individual diode segments emit sufficient light to excite the rod shaped gain medium such that laser action is produced.

2. The laser assembly of claim 1 wherein said end mounts have a compliant compression element that mechanically fixes one end of the rod.

3. The laser assembly of claim 2 wherein said intermediate mounts include a support structure comprising TEFLON.

4. The laser assembly of claim 3 consisting of two end segments, seven diode segments, and two intermediate segments.

5. The laser assembly of claim 4 wherein said two intermediate segments have a three diode segment stack interposed between them and a two diode segment stack on their other end.

\* \* \* \* \*